United States Patent [19]

Dannoux et al.

[11] Patent Number: 4,943,130
[45] Date of Patent: Jul. 24, 1990

[54] INTEGRATED OPTICAL COMPONENT

[76] Inventors: Thierry L. Dannoux, 8 rue Saint Louis, 77300 Fontainebleau; Pierre J. Laroulandie, 70 rue Bernard Palissy, 77210 Avon; Jean-Pierre Themont, 19, rue des Housseaux, 77690 Montigny-Sur-Loing, all of France

[21] Appl. No.: 166,388

[22] Filed: Mar. 10, 1988

[30] Foreign Application Priority Data

Mar. 12, 1987 [FR] France ................................ 87 03385

[51] Int. Cl.⁵ .............................................. G02B 6/12
[52] U.S. Cl. ............................... 350/96.12; 360/96.11
[58] Field of Search ............... 350/96.12, 96.13, 96.14, 350/96, 15, 96.20, 96.11

[56] References Cited

U.S. PATENT DOCUMENTS

| | | | |
|---|---|---|---|
| 4,474,429 | 10/1984 | Yoldas et al. | 350/320 |
| 4,732,449 | 3/1988 | Fan | 350/96.20 X |
| 4,765,720 | 8/1988 | Dohan et al. | 350/96.12 |
| 4,767,174 | 8/1988 | Carenco et al. | 350/96.20 |

FOREIGN PATENT DOCUMENTS 61-72206A  4/1986  Japan .

OTHER PUBLICATIONS

Optical Waveguide Components in Organic Photochromic Materials, Authors: I. Bennion, A. G. Hallam and W. J. Stewart, pp. 313-320, Date: Sep. 1983, vol. 53, No. 9, The Radio and Electronic Engineer.

*Primary Examiner*—John D. Lee
*Assistant Examiner*—Phan T. Heartney
*Attorney, Agent, or Firm*—K. McNeill Taylor, Jr.

[57] ABSTRACT

An integrated optical component with ion diffused optical circuit paths in glass connected to optical fibers, comprising a transverse exit groove machined adjacent the paths, a plateau for supporting an uncoated portion of the optical fibers for connection to the paths, and a shoulder adjacent the plateau for supporting a coated portion of the fiber, the fiber endfaces being secured to the terminations of the paths by means of an adhesive; and, a method for manufacturing such a component comprising machining, approximately alignment, precise alignment, and gluing steps.

14 Claims, 1 Drawing Sheet

4,943,130

INTEGRATED OPTICAL COMPONENT

BACKGROUND OF THE INVENTION

The present invention relates to an integrated optical component and its manufacture.

Integrated optical components have been produced using ion diffusion techniques. French Pat. No. FR-A-2,574,950 depicts an integrated optical component having a monolithic glass body with at least one optical circuit path formed through ion exchange on its surface. The optical circuit path has the same constituents as the glass body plus ions which increase its refractive index to a value greater than that of the glass body. The glass body is provided with, on at least one of its sides where the optical circuit path exits, a sectioned cavity molded into the glass body. The optical circuit path ends at the said sectioned cavity and is aligned with it in such a way that an optical device, for example, an optical fiber, is positioned in the cavity and thereby optically aligned with the optical circuit path. The sectioned cavity can be formed with a transverse section groove in the shape of a V. This integrated optical component can be manufactured by a process consisting of:

(a) molding with high precision a monolithic glass body having a sectioned cavity on at least one of its sides, and (b) forming in the piece obtained in (a), at least one optical circuit path by the ion exchange, i.e., ion diffusion, technique, with one end of this path being aligned with the sectioned cavity in such a way that an optical device positioned in the the cavity is optically aligned with the optical circuit path.

This integrated optical component can be, for example, a connector, a coupler-divider, a single-mode coupler, a single-mode multiplexer coupler, a multimode multiplexer coupler, a coupler allowing an optical fiber to be lined up with a collimating lens, or a multimode monitor.

However, in the component described in French Pat. No. FR-A-2,574,950, the alignment precision of the sectioned cavities with the optical circuit paths is very delicate, especially for the manufacture of single-mode couplers which require a greater precision in positioning the fibers than the multimode couplers.

It is therefore an object of the present invention to provide a new integrated optical component whose construction is more precise and whose manufacture is easier and at a lower cost.

SUMMARY OF THE INVENTION

One aspect of the present invention relates to an integrated optical component comprising a glass substrate with at least one ion diffused optical circuit path connected to at least one optical fiber and further comprising: at least one transverse exit groove (6,10) forming a vertical lateral surface (7) at a termination of said optical circuit path, an endface of said optical fiber abutting said termination at said vertical lateral surface; plateau support means (5,11) adjacent the side of said transverse exit groove opposite said optical circuit path, for supporting an uncoated portion of said optical fiber; second support means (4,12) adjacent the side of said plateau support means opposite said optical circuit path, for supporting a coated or sheathed portion of said optical fiber; and, first adhesive means for securing said optical fiber endface to said vertical lateral surface.

Another aspect of the invention relates to a method for manufacturing such an integrated optical component which connects an optical fiber to an ion exchange optical circuit path comprising: forming a glass body substantially in the form of a rectangular glass block; creating at least one optical circuit path in said glass body by ion exchange; mechanically machining at least one transverse exit groove to create an termination for said optical circuit path; mechanically machining a transverse support shoulder for supporting a coated or sheathed portion of said fiber; forming plateau support means for supporting an uncoated portion of said fiber; approximately aligning an endface of said fiber with said optical circuit path termination; precisely aligning said fiber endface and said optical circuit path termination by means of a micromanipulator tool; and, securing said fiber endface to said optical circuit path termination with an adhesive means.

DESCRIPTION OF THE EXEMPLARY EMBODIMENTS

Figure 1:
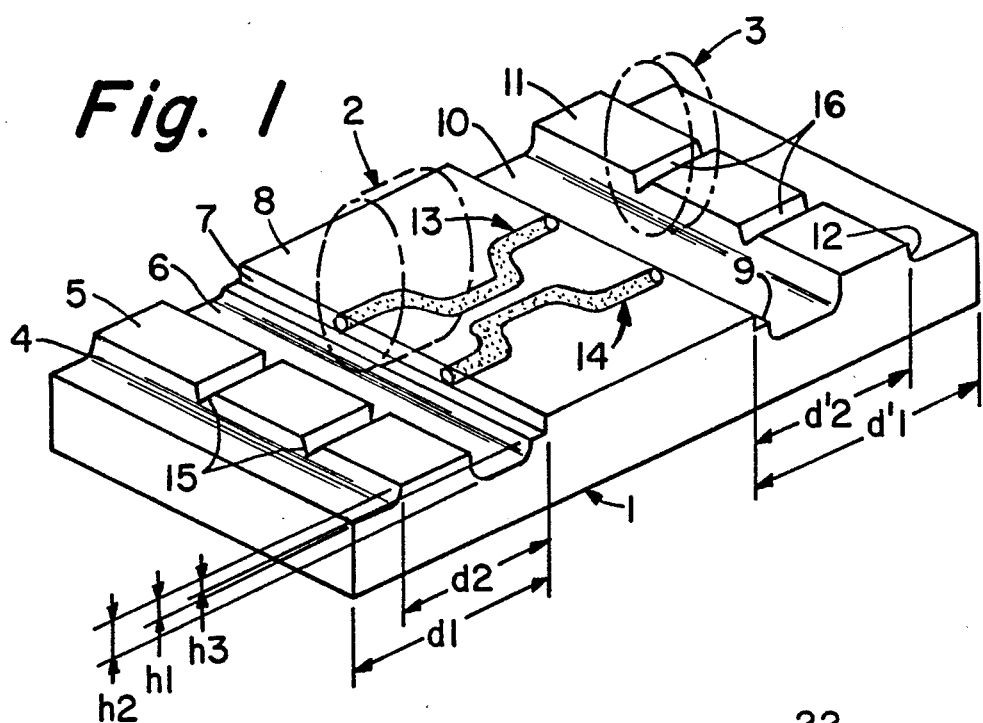
FIG. 1 is a schematic view in perspective illustrating the body of the inventive integrated optical component in the form of a coupler.

In FIG. 1, a monolithic glass body 1 obtained by molding is depicted, with a general rectangular block form. The glass body has been mechanically machined, for example, by means of abrasive grinding wheels such as 2 and 3, in such a way as to appear from left to right:

a first transverse support shoulder 4 with a depth of $h_1$, a first plateau support means 5, a first transverse exit groove 6 with a depth of $h_2$, a first transverse interface shoulder 7 with a depth of $h_3$ adjacent to groove 6, a horizontal central plane portion 8, a second transverse interface shoulder 9 with a depth of $h_3$, a second transverse exit groove 10 with a depth of $h_2$ adjacent to the shoulder 9, a second plateau support means 11, and a second transverse support shoulder 12 with a depth of $h_1$.

The central plane portion includes near its surface, two similar optical paths, 13 and 14, formed by ion exchange (i.e., ion diffusion), these paths including the same constituents as the glass body plus ions which raise their refractive index to a value greater than that of the glass body. The technique for realizing these optical paths is known (see French Patent FR-A-2,574,950 for more details). Preferably, the optical paths are made prior to the mechanical machining of the glass body.

The plateau support means 5 and 11 depicted in FIG. 1 include two sectioned longitudinal cavities 15 and 16 respectively, for example, at a transverse section in the form of a V, which are aligned approximately with the corresponding ends of the optical paths 13 and 14. These cavities can be achieved by molding, or by precision grinding, to list two examples.

In an alternative embodiment, plateau support means 5 and 11 are formed or machined so that they are flat but have the proper height for approximate vertical alignment of the fibers. For example, their height may equal the depth of the optical circuit paths depicted in FIG. 1. In this alternative embodiment, a jig external to the glass body, but aligned with reference to the glass body, is used to hold the optical fibers in approximate alignment prior to precise alignment by a micromanipulator tool.

In yet another alternative embodiment, the transverse support shoulder may be replaced by other suitable support means for attaching or otherwise supporting a coated or sheathed portion of said fiber.

In FIG. 1, plateau support means 5 and 11 and the central portion 8 are on the same level and correspond to the upper surface of body 1. The depth $h_1$ of the support shoulders 4 and 12 corresponds to the diameter of the coating of the optical fibers to be connected. The depth of $h_3$ of interface shoulders 7 and 9 will ordinarily be slightly greater than the diameter of the stripped optical fibers to be connected. Depth $h_2$ of exit grooves 6 and 10 will ordinarily be greater than $h_3$. As an illustration, $h_3$ can be equal to 200 $\mu$m, $h_1$ can be equal to 250 $\mu$m, and $h_2$ can be equal to 400 $\mu$m.

The transverse exit grooves allow precise alignment between an optical fiber endface and a termination of the optical circuit path by means of the micromanipulator tool (well known to one skilled in the art), after the fiber is approximately aligned with the optical circuit path to which it is to be connected. This initial alignment may be carried out by means of the alignment jig referred to above which contacts the fiber outside the glass body or another form of alignment device, as well as by means of the sectioned cavities formed in the plateau support means opposite the optical circuit path termination as depicted in FIG. 1.

The depth of the transverse exit grooves must be sufficient for the micromanipulator to align precisely the optical fiber by grasping the fiber within the grooves after initial approximate alignment. Ordinarily, the depth of the transverse exit grooves will be on the order of several tenths of a millimeter (mm). The width of the transverse exit grooves also must be sufficient for movement of the fiber within the grooves to align the fiber precisely. For example, it can be on the order of 2 to 6 mm. The vertical lateral surface adjacent the optical circuit path termination should have a precise finish, (namely, an absence of scaling), as it is used as the interface for joining the optical fibers to the optical circuit path terminations.

In the embodiment depicted in FIG. 1, each of the transverse exit grooves is formed with a relatively deep part and a less deep part making up a transverse interface shoulder having a vertical surface serving as an interface for the joining of the optical fibers to the optical circuit path termination. In this embodiment, the reduced depth of the vertical surface of the interface shoulder allows it to be machined more easily with the necessary high surface quality. In an alternative embodiment, the transverse interface shoulders are eliminated and only one machining step is required to create both the vertical lateral surface and the transverse exit groove, although more steps may be utilized if desired.

Figure 2:
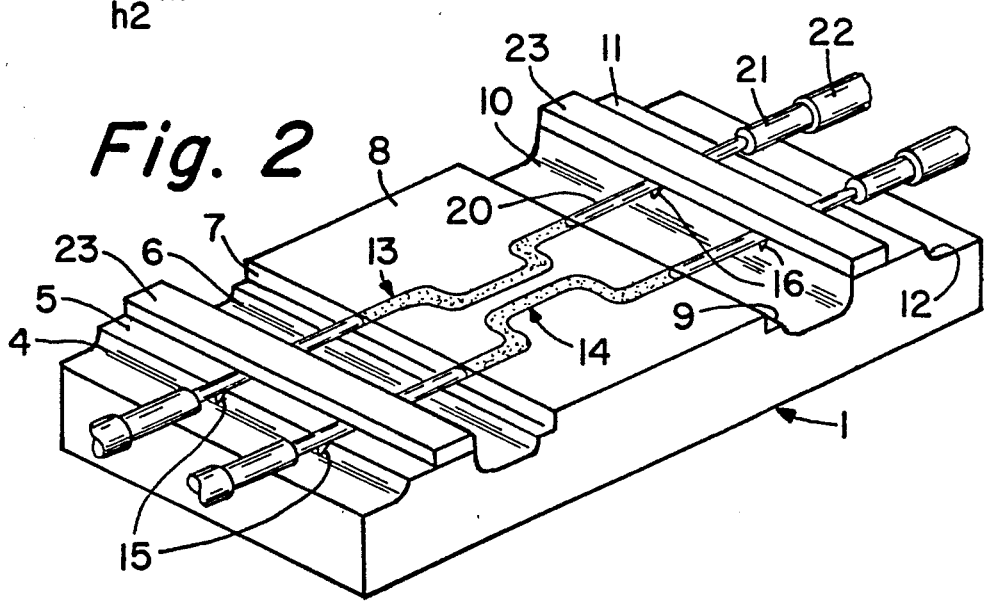
FIG. 2 is a schematic view of the component from FIG. 1 showing the mounting of the optical fibers

In FIG. 2, the mounting of the optical fibers on the body machined in FIG. 1 is represented. Optical fibers 20 are normally covered with a coating 21 and a sheath 22. Before mounting an optical fiber, its end is prepared by removing the sheath 22 on a length that is slightly greater than the distance ($d_1$ and $d'_1$) separating the left or right end of the block from the vertical lateral surface of the first or second interface shoulders, and removing the coating 21 on a length slightly greater than the distance ($d_2$ and $d'_2$) separating the vertical side of the first or second support shoulder from the vertical lateral surface of the first or second interface shoulder. It should be noted that in this representative embodiment, $d_1=d'_1$ and $d_2=d'_2$, but this is not necessary.

Thereafter, the stripped portions of the fibers are positioned in the cavities 15 and 16 in such a way that their extreme ends come near the vertical lateral surface of the interface shoulder (7,9) (for example 2 to 5 $\mu$m). These fiber ends are aligned approximately with the terminations of optical paths 13 and 14, and the end of the stripped portions of fiber are spaced from the horizontal surface of interface shoulder (7,9) by a distance of several hundredths of a mm. From their side, the coated portions come to rest on the horizontal surface of support shoulder 4 or 12.

In the alternative embodiment without sectioned cavities which is described above, an external jig whose position is referenced to the glass bodies (and the optical circuit paths) is attached to the fibers to provide approximate alignment.

In another alternative embodiment, the fiber sheathing may be attached to a second support means at the side of the plateau support means opposite the optical circuit paths, eliminating the need for the transverse support shoulder.

On plateau support means 5 and 11, covering strips 23 for securing the fibers in cavities 15 and 16 are applied. The covering strips are secured with the aid of a glue 24 such as an acrylate glue, covering the portions of the fibers at the plateau support means (5 and 11) and at the first and second support shoulders (4 and 12). In an alternative embodiment, the covering strips 23 are eliminated and glue is used as an adhesive means without the strips. In another alternative embodiment, sealing glass frit or low temperature metal alloy may be used as an adhesive means.

Also, the free ends of the fibers are precisely aligned with the optical circuit paths with the help of a micromaniuplator. The use of a micromanipulator is made possible by the presence of exit grooves which provide sufficient space for the micromanipulator to grasp the fibers. The ends of the fiber are then glued against the vertical lateral surface of interface shoulders 7 and 9, for example, with the help of a glue joint 25 which is of optical quality and which can be hardened by ultraviolet rays, in a known manner.

In a preferred embodiment, the order of assembly is as listed above, with the glue joint 25 applied last.

Figure 3:
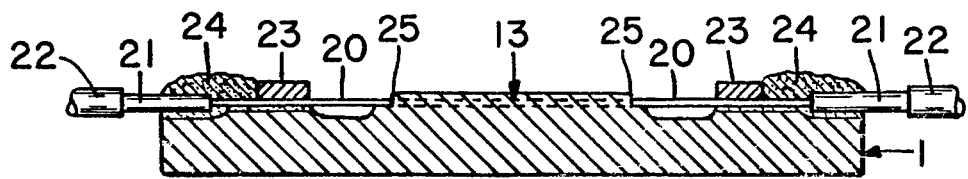
FIG. 3 is a vertical longitudinal cross section of the completed component.

The component represented in FIGS. 1 to 3 is a single-mode coupler, but it is understood that one could also use this invention in order to make a multimode coupler, a connector, a coupler-divider, a single-mode multiplexer coupler, a multimode multiplexer coupler, a multimode monitor, etc. in a way similar to that described in French Patent FR-A-2,574,950.

It is to be understood that the invention is not limited to the exact details of construction, operation, exact materials, or embodiment shown and described, as modifications and equivalents will be apparent to one skilled in the art without departing from the scope of the invention. Accordingly, the invention is to be limited only by the scope of the appended claims.

We claim:

1. An integrated optical component comprising a glass substrate with at least one ion diffused optical circuit path connected to at least one optical fiber and further comprising:

at least one transverse exit groove (6,10) forming a vertical lateral surface (7) at a termination of said optical circuit path, an endface of said optical fiber abutting said termination at said vertical lateral surface;

plateau support means (5,11) adjacent the side of said transverse exit groove opposite said optical circuit path, for supporting an uncoated portion of said optical fiber;

second support means (4,12) adjacent the side of said plateau support means opposite said optical circuit path, for supporting a coated or sheathed portion of said optical fiber; and, first adhesive means for securing said optical fiber endface to said vertical lateral surface.

2. The integrated optical component of claim 1, wherein the dimensions of said transverse exit groove are sufficiently large to allow positioning of said optical fiber by a micromanipulator in contact with said optical fiber within said transverse exit groove.

3. The integrated optical component of claim 1, wherein said transverse exit groove further comprises a transverse interface shoulder which includes said vertical lateral surface and which also includes a horizontal surface whose depth is approximately the same as or slightly greater than the depth of said optical circuit path.

4. The integrated optical component of claim 1, wherein said plateau support means comprises a raised surface whose height is approximately the same as or slightly less than the height of the bottom of said optical circuit path.

5. The integrated optical component of claim 1, wherein said second support means comprises a transverse support shoulder.

6. The integrated optical component of claim 5, further comprising second adhesive means for securing said uncoated portion of said optical fiber to said plateau support means and for securing said coated portion of said optical fiber to said transverse support shoulder.

7. The integrated optical component of claim 6, wherein said second adhesive means comprises a single glue joint.

8. The integrated optical component of claim 1, wherein at least two optical circuit paths are arranged to form a single-mode coupler or coupler-divider.

9. The integrated optical component of claim 1, wherein said plateau support means comprises a raised plateau with at least one sectioned cavity for receiving an optical fiber and approximately aligning its endface with said optical circuit path termination.

10. The integrated optical component of claim 9, wherein said transverse exit groove further comprises a transverse interface shoulder which includes said vertical lateral surface and which also includes a horizontal surface whose depth is approximately the same as or slightly greater than the depth of said optical circuit path.

11. The integrated optical component of claim 10, wherein said second support means comprises a transverse support shoulder, and further comprising second adhesive means for securing said uncoated portion of said optical fiber to said plateau support means and for securing said coated portion of said optical fiber to said transverse support shoulder.

12. The integrated optical component of claim 11, further comprising a covering means in addition to said second adhesive means for securing said uncoated portion of said optical fiber within said sectioned cavity to said plateau support means.

13. The integrated optical component of claim 11, wherein said second adhesive means comprises a single glue joint.

14. The integrated optical component of claim 9, wherein at least two optical circuit paths are arranged to form a single-mode coupler or coupler-divider.

* * * * *

UNITED STATES PATENT AND TRADEMARK OFFICE
CERTIFICATE OF CORRECTION

PATENT NO. : 4,943,130

DATED : July 24, 1990

INVENTOR(S) : T. L. Dannoux et al.

It is certified that error appears in the above-identified patent and that said Letters Patent is hereby corrected as shown below:

On the Title page:
Assignee should read as follows: CORNING GLASS WORKS

Signed and Sealed this

Sixteenth Day of March, 1993

Attest:

STEPHEN G. KUNIN

*Attesting Officer*          *Acting Commissioner of Patents and Trademarks*